United States Patent

[11] 3,545,517

[72] Inventor Henry Sauer
 Sickle Hill Road, Box 143, Berne, New York 12023
[21] Appl. No. 796,123
[22] Filed Feb. 3, 1969
[45] Patented Dec. 8, 1970

[54] STRAP-ON TYPE TIRE CHAINS
 6 Claims, 8 Drawing Figs.
[52] U.S. Cl. .................................................. 152/233
[51] Int. Cl. ................................................... B60c 27/02
[50] Field of Search ....................................... 152/233, 235, 237

[56] References Cited
UNITED STATES PATENTS
1,456,473  5/1923  Summerfield ............... 152/233
2,457,068  12/1948  Peterson ...................... 152/237

Primary Examiner—James B. Marbert
Attorney—Frank Ledermann

ABSTRACT: A simple retaining means for the free end portion of the strap which is passed around the wheel felloe, consists of a hinge ear hinged to the adjacent chain-holding plate, wherein said end portion is doubled back between the plate and the hinge ear with the bight of the fold in the strap positioned beyond the edges of the hinge ear and plate, the hinge ear being clamped down tightly against the plate with the two-layer strap end therebetween by a self-locking wing nut thereby preventing loosening of the mounted device.

PATENTED DEC 8 1970
3,545,517
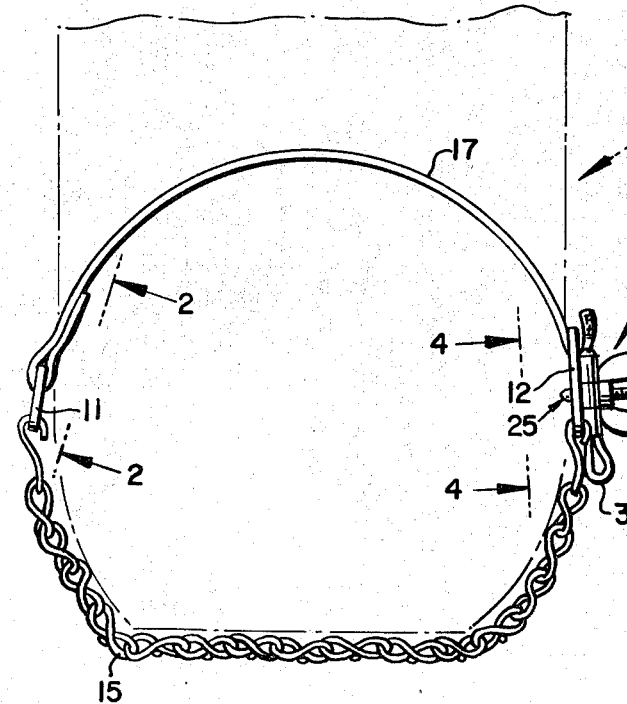
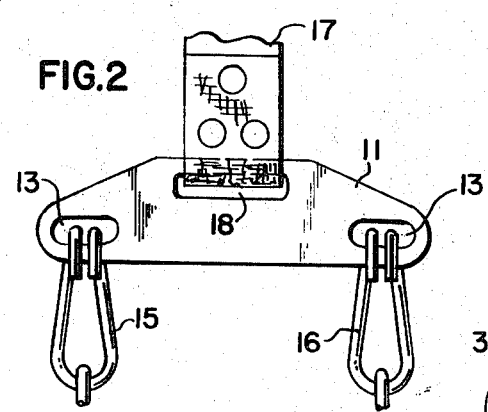
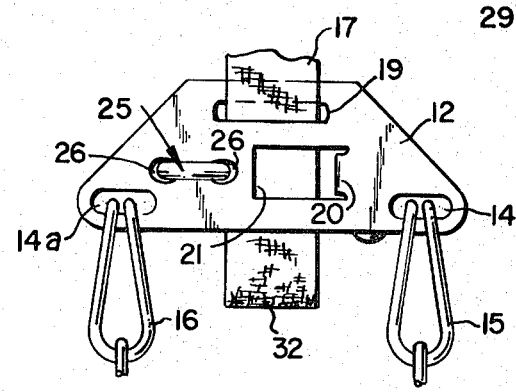
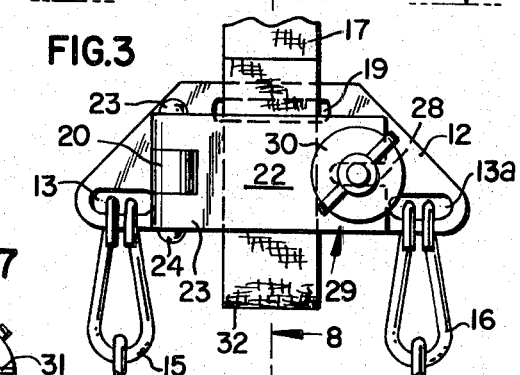
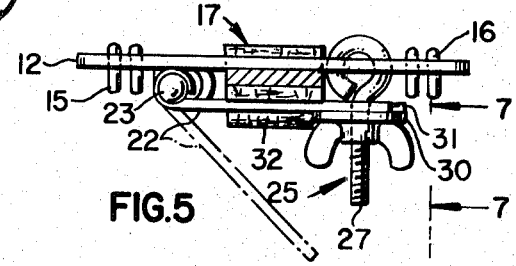
*INVENTOR.*
HENRY SAUER
BY  J. Ledermann
ATTORNEY

STRAP-ON TYPE TIRE CHAINS

Strap-on type tire chains generally include essentially two substantially triangular metal plates to which opposite ends of lengths of chain are secured. The strap is permanently attached to one of the plates, and means is provided on or in the other plate for attaching the free end of the strap thereto after passing the strap around the felloe of the wheel. Such attaching means in devices at present available on the market require careful threading of the strap successively through a plurality of slots and over or under portions of the said other plate, and the result is merely a friction-locking means which is subject to loosening. Moreover, in cold weather, particularly when the chains must be applied out of doors, it is a difficult and time-consuming job to thread the strap as required, what with cold hands and the cold metal being handled. The repeated threading operation requires such accurate manipulation that it cannot be done while wearing gloves, and where the free extremity of the strap is rough or frayed the task is all the more complicated.

The present invention overcomes the above disadvantages in that either no threading at all is required, or at most a single threading through a slot, so that the entire operation is extremely simple and can be completed in a minimum of time. Further, the locking means of the free end of the strap is absolutely positive to prevent the strap from becoming loosened or disengaged while the chains are in use.

Referring briefly to the accompanying drawing:

FIG. 1 is a view illustrating the strap-on type tire chain unit of the present invention substantially as it would appear in mounted position, the wheel and tire being shown only partly and in phantom.

FIG. 2 is an enlarged fragmentary view as seen along the line 2–2 of FIG. 1.

FIG. 3 is an enlarged fragmentary view as seen along the line 3–3 of FIG. 1.

FIG. 4 is an enlarged fragmentary view as seen along the line 4–4 of FIG. 1.

FIG. 5 is a view, partly in section, as seen along the line 5–5 of FIG. 3.

FIG. 6 is a fragmentary side view of the wing nut-locking member threaded on the pivoted eye bolt, forming part of the strap-locking means.

FIG. 7 is a bottom plan view of the wing nut of FIG. 6 per se.

FIG. 8 is a sectional view taken on the line 8–8 of FIG. 3.

Referring in detail to the drawing, the numeral 10 designates diagrammatically a portion of the tire of an automobile wheel. Since both tired wheels and the position of a strap-on type of tire chain mounted thereon are well known, it is not believed necessary to show any structural features of the wheel and tire.

The device of the present invention includes, as usual, two substantially triangular plates 11 and 12. The first plate 11 has the usual two slots 13 and 13a, and the second plate 12 has the usual two slots 14, 14a. The ends of one chain 15 are permanently secured in the slots 13, 14 and likewise the ends of the chain 16 are secured in the slots 13a, 14a.

The usual strap 17 is permanently secured in the third slot 18 of the plate 11 near the leading edge thereof in an obvious manner. The second plate 12 is shown having an equivalent third slot 19 near the leading edge thereof. Additionally, as part of the present invention, an intermediate or middle hinge sleeve 20 is shown formed out of a tongue cut out of the plate 12 thereby leaving a cutout 21 in the plate. A hinge plate or ear 22 has the midportion of one end thereof cut away to provide two arms which are rounded to the same degree as the sleeve 20 to provide alined outer or end hinge sleeves 23. A hinge pin 24 extends through the thus formed complete hinge sleeve, whence the ear 22 is hinged to the plate 12. Of course a suitable hinge sleeve joining the ear 22 to the plate 12 may be provided in other ways, but for the purpose of the present invention as well as for economy in manufacture, the structure illustrated is preferred.

A threaded eye bolt 25 has its rounded "eye" end passing through two spaced holes 26 in the plate 12, whence it is pivotal with respect to this plate, and its threaded stem 27 extends outward, that is, to the right, FIG. 1. The end of the ear 22 opposite the hinge end is bifurcated to provide a slot 28 through which the stem 27 is adapted to pass. A wing nut 29 has an enlarged disc-shaped base 30 integral therewith, the base being provided with a radial ridge 31 on its underside. This ridge is registrable in the slot 28 of the ear 22. It is to be noted that the two holes 26 and the slot 28 lie in a common plane at right angles to the ear 22 and the plate 12.

In use, after the device has been positioned as exemplified by FIG. 1, the free end portion of the strap 17 may be, as shown, passed through the slot 19 in the plate 12, with the ear 22 swung to open position, over the plate 12 and preferably doubled back thereon thereby forming the bight 32 beyond the confines of the ear and plate. Or the strap may be passed directly over the plate without entering the slot 19. With the wing nut 29 unscrewed a sufficient distance, the ear 22 is swung down against the strap while the bolt 25 is swung to engage the stem 27 in the end slot 28. Finally, the wing nut is screwed down tightly against the strap and the tightening thereof terminates in registration of the ridge 31 in the end slot 28, as shown in FIGS. 3 and 5. Thus there is no possibility that the strap might slip out of or even loosen from its locked position.

The essential characteristic of the illustrated eye bolt 25 is that it is mounted in or attached to the plate 12 so that it may pivot or swing substantially in the plane of the end slot 28. The particular structure shown provides this feature, and by limiting the swinging of the bolt to substantially such a plane the concluding steps of the operation are further simplified.

I claim:

1. In a strap-on type tire chain which includes a first plate and a second plate joined to each other by chains and a strap having one end portion thereof permanently secured to said first plate, said second plate having means thereon for securing the other end portion of the strap thereto, said means comprising a hinge ear hinged to said second plate and adapted to be swung down toward said second plate, said other end portion of the strap lying in a position between said second plate and said ear, said ear having a slot therein remote from the hinge end thereof, a threaded bolt pivotally secured to said second plate and extending upward therefrom and lying substantially in a common plane with said slot, said bolt being pivotable in said plane to pass through said slot when said ear is positioned relatively close to said second plate, and a nut threaded on said bolt adapted when said bolt passes through said slot to clamp said ear against said other end portion of the strap.

2. In a tire chain according to claim 1, said nut having a base engaging said ear, said base having on the side thereof facing said ear a projection registrable in said slot.

3. A tire chain according to claim 2, said projection comprising a radial ridge.

4. In a tire chain according to claim 2, said second plate having two spaced holes therein lying in said plane, the "eye" of said bolt registering in said two spaced holes.

5. In a tire chain according to claim 2, said second plate having a slot near the leading edge thereof, said other end portion of the strap extending through said last-named slot into said position between said second plate and said ear.

6. In a tire chain according to claim 2, said other end portion of the strap between said second plate and said ear being doubled back about a bight which is positioned beyond but adjacent the edges of said second plate and said ear.